(12) United States Patent
Boenisch et al.

(10) Patent No.: US 9,767,293 B2
(45) Date of Patent: *Sep. 19, 2017

(54) CONTENT BASED HARDWARE SECURITY MODULE ASSIGNMENT TO VIRTUAL MACHINES

(71) Applicant: INTERNATIONAL BUSINESS MACHINES CORPORATION, Armonk, NY (US)

(72) Inventors: Volker M. M. Boenisch, Boeblingen (DE); Reinhard Buendgen, Tuebingen (DE); Franziska Geisert, Altdorf (DE); Jakob C. Lang, Altdorf (DE); Mareike Lattermann, Stuttgart (DE); Angel Nunez Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,651

(22) Filed: Feb. 13, 2015

(65) Prior Publication Data

US 2016/0239667 A1 Aug. 18, 2016

(51) Int. Cl.
*H04L 9/08* (2006.01)
*G06F 21/60* (2013.01)
*G06F 9/455* (2006.01)

(52) U.S. Cl.
CPC ........ *G06F 21/602* (2013.01); *G06F 9/45545* (2013.01); *G06F 9/45558* (2013.01); *H04L 9/0819* (2013.01); *G06F 2009/45587* (2013.01)

(58) Field of Classification Search
CPC ................................ H04L 9/08; H04L 9/0877
See application file for complete search history.

(56) References Cited

U.S. PATENT DOCUMENTS 6,393,564 B1 * 5/2002 Kanemitsu ............ H04L 9/0877
380/277
8,327,143 B2 * 12/2012 Ilyadis .................. H04L 9/3271
380/268

(Continued)

OTHER PUBLICATIONS

Boenisch et al., "Content Based Hardware Security Module Assignment to Virtual Machines," U.S. Appl. No. 14/941,545, filed Nov. 14, 2015, pp. 1-32.

(Continued)

*Primary Examiner* — Saleh Najjar
*Assistant Examiner* — Devin Almeida
(74) *Attorney, Agent, or Firm* — William A. Kinnamon, Jr., Esq.; Kevin P. Radigan, Esq.; Helsin, Rothenberg, Farley & Mesiti (57) ABSTRACT

At least one hardware security module out of a plurality of hardware security modules is assigned to a guest system. The at least one hardware security module out of the plurality of hardware security modules is configured with a master key. A data pattern is used for a challenge protocol adapted to prove that the at least one hardware security module out of the plurality of hardware security modules is configured with the master key. The at least one hardware security module including the master key is assigned to the guest system based on a positive outcome of the challenge protocol.

14 Claims, 7 Drawing Sheets (56) References Cited

U.S. PATENT DOCUMENTS

| | | | |
|---|---|---|---|
| 8,811,223 B2* | 8/2014 | Kanekar | H04L 63/166 370/254 |
| 9,020,149 B1* | 4/2015 | Golwalkar | H04L 9/0897 380/255 |
| 2003/0108204 A1* | 6/2003 | Audebert | H04L 9/083 380/277 |
| 2003/0177401 A1* | 9/2003 | Arnold | H04L 9/0863 713/155 |
| 2014/0223174 A1* | 8/2014 | Krishnamurthy | H04L 63/0823 713/158 |
| 2014/0229737 A1* | 8/2014 | Roth | H04L 9/088 713/176 |

OTHER PUBLICATIONS

List of IBM Patents of Patent Applications Treated as Related, Mar. 18, 2016, pp. 1-2.

Boenisch et al., Final Office Action for U.S. Appl. No. 14/941,545, filed Nov. 14, 2015 (U.S. Patent Publication No. 2016-0241393-A1), dated Aug. 18, 2016, (11 pages).

Boenisch et al., Office Action for U.S. Appl. No. 14/941,545, filed Nov. 14, 2015 (U.S. Patent Publication No. 2016-0241393-A1), dated Dec. 1, 2016, (15 pages).

* cited by examiner

CONTENT BASED HARDWARE SECURITY MODULE ASSIGNMENT TO VIRTUAL MACHINES

BACKGROUND

One or more aspects relate generally to assigning at least one out of a plurality of hardware security modules to a guest system, and particularly to an assignment method, a related assignment system, and a computer program product.

In today's computer systems and information transport networks, cryptographic elements are important technological components. Information may be stored or transmitted in a cryptographically secured form in order to avoid unauthorized access to the information stored or transmitted. In some cases, pure software-based techniques may be used and, in other cases, hardware support and security specific elements may be used to perform such data protection. In some cases, these specific elements are named hardware security modules (HSMs) which may be used as part of a computer or an information transmission system. Such a hardware security module may include specific circuitries in order to provide functions for data encryption and data decryption. The function may also include generating and storing cryptographic keys for a use of guest systems.

There are several disclosures related to a method for assigning at least one out of a plurality of hardware security modules to a guest system. For example, document U.S. Pat. No. 8,811,223 B2, which is hereby incorporated by reference herein in its entirety, discloses systems and methods for distributed operation of a plurality of cryptographic cards in a multi-core system. In embodiments, a plurality of cryptographic cards providing encryption/decryption resources are assigned to a plurality of packet processing engines and operate on a multi-core processing system.

A typical limitation of conventional technologies is that a mapping of hardware security modules to functions and programs is assumed to be a given fact. A manual assignment process may be required.

SUMMARY

One or more aspects may include a method for assigning at least one out of a plurality of hardware security modules to a guest system, an assignment system for assigning at least one out of a plurality of hardware security modules to a guest system, and a computer program product for assigning at least one out of a plurality of hardware security modules to a guest system.

According to one embodiment, a method of assigning at least one out of a plurality of hardware security modules to a guest system may be provided. The method may include configuring the at least one hardware security module out of the plurality of hardware security modules with a master key, using a data pattern for a challenge protocol which may be adapted to prove that the at least one out of the plurality of hardware security modules is configured with the master key, and assigning the at least one out of the plurality of hardware security modules including the master key to the guest system based on a positive outcome of the challenge protocol.

According to another embodiment, an assignment system for assigning at least one out of a plurality of hardware security modules to a guest system may be provided. The assignment system may include at least one hardware security module out of the plurality of hardware security modules including a memory adapted to store a master key. The assignment system may also include a determination unit as part of the guest system. The determination unit may be adapted to generate an outcome based on a data pattern for a challenge protocol adapted to prove that the at least one out of the plurality of hardware security modules includes the master key. The assignment system may further include an assigning unit adapted to assign the at least one out of the plurality of hardware security modules including the master key to the guest system based on a positive outcome of the challenge protocol.

Computer program products relating to one or more aspects are also described and claimed herein.

BRIEF DESCRIPTION OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings. Embodiments of aspects of the invention are described, by way of example only, and with reference to the following drawings, in which:

DETAILED DESCRIPTION

In the context of this description, the following conventions, terms and/or expressions may be used:

The term 'hardware security module' or HSM may denote a pluggable component or an individually connected component to a computer system. The HSM may perform encryption and decryption operations using a master key or another provided key, e.g., a guest key. The encryption and/or decryption may be performed in hardware and software, or any combination of both, on the hardware security module. Data may be received by the hardware security module in an unencrypted way and may be encrypted on the HSM, or vice versa.

The term 'guest system' may denote, e.g., an operating system being executed in a virtual machine, VM, on a hypervisor. A user may be assigned to the guest system. It may be that a specific cryptographic key may be assigned to the guest system. The mentioned hypervisor may be used in performing such an assignment. The specific cryptographic key may be stored on an HSM.

The term 'content' may denote any character-based string. The string may comprise readable text or any other binary data.

The term 'a data pattern' may basically be another expression for content. The data pattern may denote a string of readable characters or may include binary data. In the context of this document, no additional requirements are placed on the data pattern. It may also be predefined, randomly selected or, otherwise determined.

The term 'master key' may denote an encryption/decryption key being stored on the HSM. In the context of this document, it may be assumed, in one embodiment, that the master key may never be transferred out of the hardware security module it is stored on.

The term 'challenge protocol' may denote a protocol between two entities, e.g., a guest system and an HSM, which may ensure that a specific guest system gets assigned to "its correct HSM". A response to the challenge may be compared to an expected result. In case both patterns match each other, the result may be seen as positive or successful. The challenge protocol may ensure that the master key stored on the HSM may not leave the HSM during the challenge protocol.

The term 'guest encryption unit' may denote a module adapted to perform an encryption and/or decryption operation within or, as part of the guest system or, as a service used by the guest system.

The term 'hardware security module encryption unit' may denote a module within the HSM being adapted to encrypt any data pattern using the master key or another provided key, e.g., the guest key. Accordingly, a 'hardware security module decryption unit' may be used for decrypting any data pattern, e.g., the guest key, using the master key or, decrypting another data pattern using another provided key, e.g., the guest key.

It may be noted that the hardware security module, i.e. an HSM, may be, e.g., a crypto card. The guest system may, e.g., be a virtual machine, i.e., a VM, running or executing a guest operating system. The configuring the HSM may include storing the master key in a memory of the HSM.

In the following, a detailed description of the figures will be given. All instructions in the figures are schematic. Firstly, a block diagram of an embodiment of a method of assigning at least one out of a plurality of hardware security modules to a guest system in accordance with one or more aspects is given. Afterwards, further embodiments as well as embodiments of the assignment system for assigning at least one out of a plurality of hardware security modules to a guest system will be described.

Figure 1:
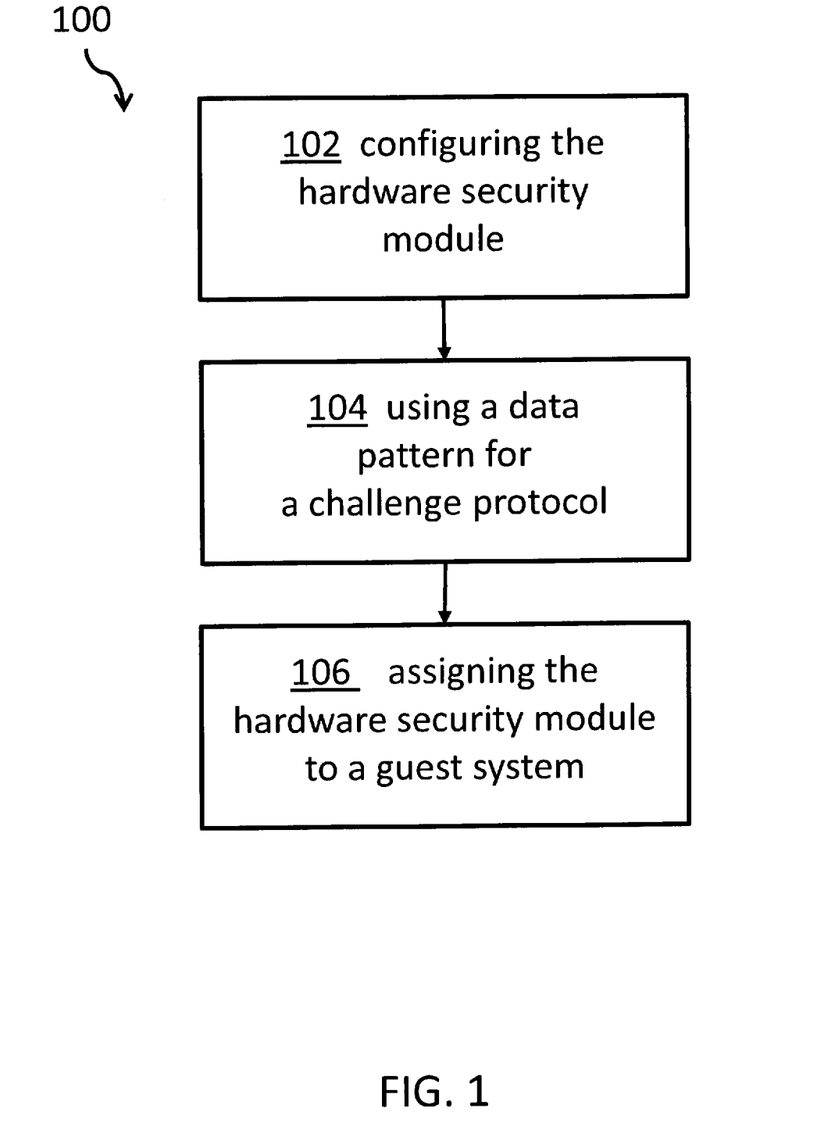
FIG. 1 shows a block diagram of an embodiment of assigning at least one out of a plurality of hardware security modules to a guest system.

FIG. 1 shows a block diagram of an embodiment 100 of assigning at least one out of a plurality of hardware security modules, i.e. an HSM, e.g., crypto card, to a guest system. This may be performed using a trusted hypervisor, an individual component or, by the guest system itself. The assigning may be based on content, i.e. a data pattern.

One aspect includes configuring, 102, the at least one hardware security module out of the plurality of hardware security modules with a master key. I.e., the master key may be stored within the HSM using a data pattern. In particular, the data pattern may be randomly selected content, e.g., the string "hello world" or, any other human readable or non-readable data string used, 104, for a challenge protocol adapted to prove that the at least one out of the plurality of hardware security modules is configured with the master key.

Furthermore, one aspect includes assigning, 106, the at least one out of the plurality of hardware security modules including the master key to the guest system based on a positive outcome, in particular a confirmation, of the challenge protocol.

Figure 2:
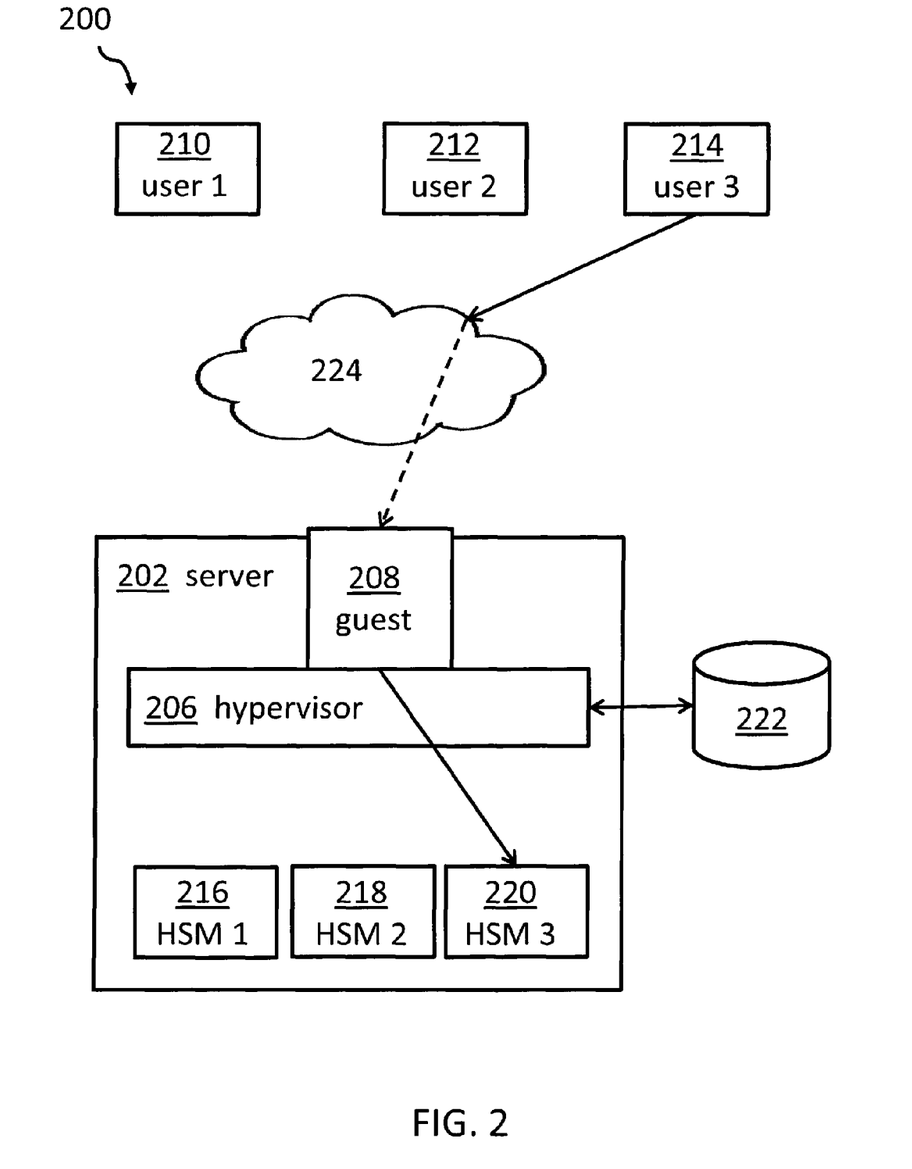
FIG. 2 shows a block diagram of a general setup for assigning a guest system being used by a user via a hypervisor to a hardware security module.

FIG. 2 shows a block diagram 200 of a general setup for assigning a guest system 208 being used by a user 210, 212 or 214 via a hypervisor 206 to a hardware security module 216, 218, 220. More specifically, a user 214 or a user system 214 may access—by means of conventional or Cloud Computing technology, being symbolized by the Cloud 224—a guest system 208 or guest operating system 208. The guest system 208, e.g., a VM, may be executed on a hypervisor 206. The hypervisor 206 may be executed by a hardware server 202. The hypervisor 206 may have access to stored information, e.g., on a disk or another storage system 222, including hardware security module configuration information for a specific guest system, e.g., user 3, 214. Other user systems 210, 212 may run different guest systems (not shown) on the hypervisor 206 using different HSM 216, 218. More than one, e.g., the HSM 3 220, may be assigned to user 3, 214. Each HSM 216, 218, 220 may store more than one cryptographic key.

Figure 3:
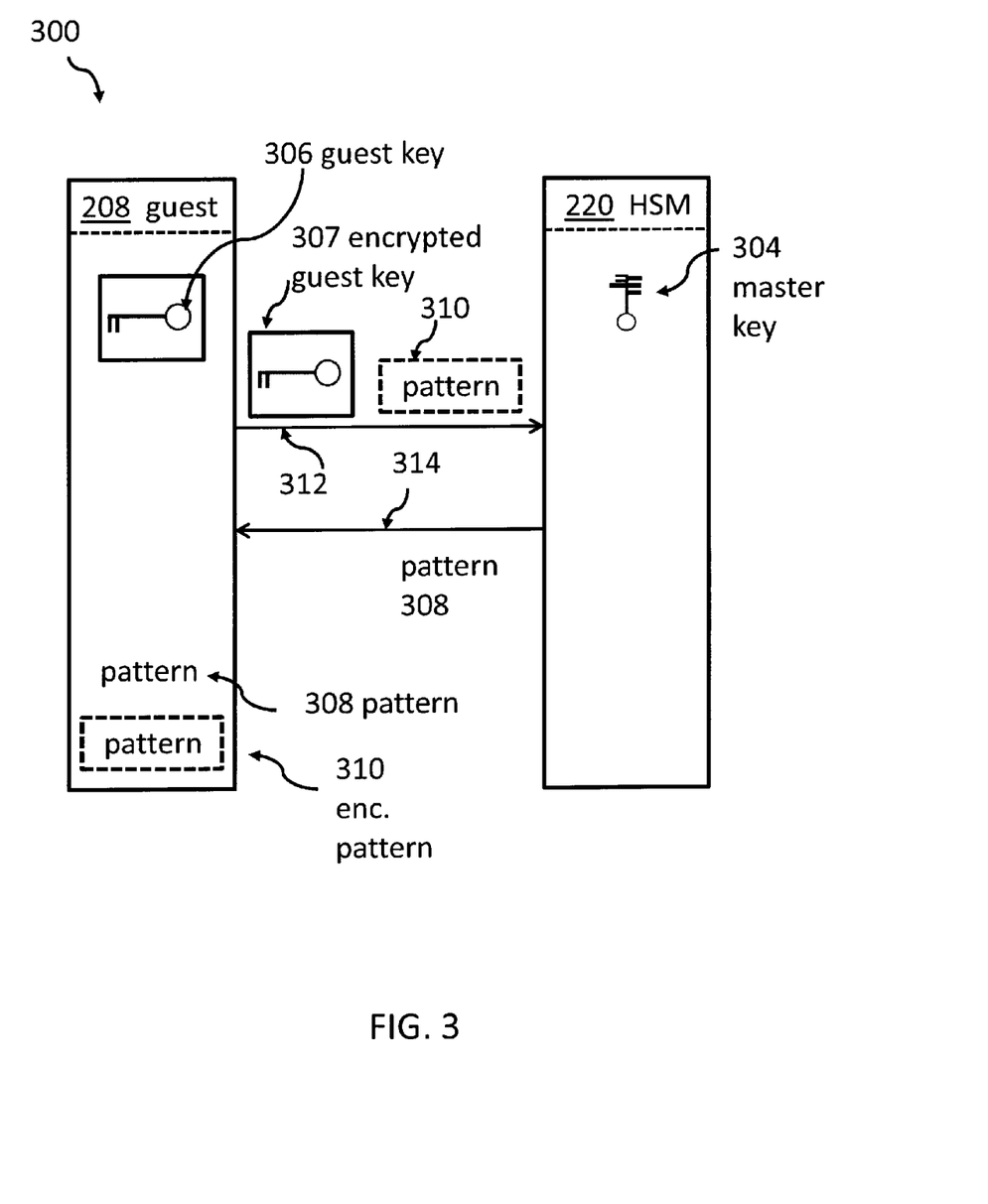
FIG. 3 shows a block diagram of an embodiment of one alternative of assigning at least one out of a plurality of hardware security modules to a guest system.

FIG. 3 shows a block diagram 300 of an embodiment of one alternative of the embodiment 100 for assigning at least one out of a plurality of hardware security modules 216, 218, 220 to a guest system 208. Initially, the guest key 306 may be encrypted with a master key 304 of the HSM 220. For this purpose, the unencrypted guest key 306 may have been sent to the HSM 220 by which it may have been encrypted using the master key 304. Also as part of an initialization step, the encrypted guest key may have been sent back to the guest system 208. Respective sending and receiving units or modules may be used for such data exchange between guest system 208 and HSM 220.

A potential challenge protocol may now be performed in the following way: In a first step, on the guest system 208 a selected pattern 308 may be encrypted using the guest key 306. It may be noted that the guest key 306 may not be encrypted by the master key 304 during this process step. As a consequence, the unencrypted guest key 306, the encrypted guest key 307, the data pattern 308 and the encrypted data pattern 310 are available within the guest system 208.

Now, the encrypted guest key 307 (encrypted by the master key 304) and the encrypted data pattern 310 (encrypted by the guest key 306) may be sent, 312, from the guest system 208 to the HSM 220. Here, the encrypted guest key 307 may be decrypted using the master key 304, potentially using the HSM decryption unit, resulting in an unencrypted guest key 306. Using this guest key 306, the HSM 220 may decrypt the encrypted data pattern 310 resulting in an unencrypted data pattern 308. This unencrypted data pattern 308 may be sent, 314, back to the guest system 208. Now, the received data pattern 308 may be compared with the original data pattern 308. In case the two data patterns match, the challenge protocol may result in a positive outcome. The challenge protocol has generated success.

Figure 4:
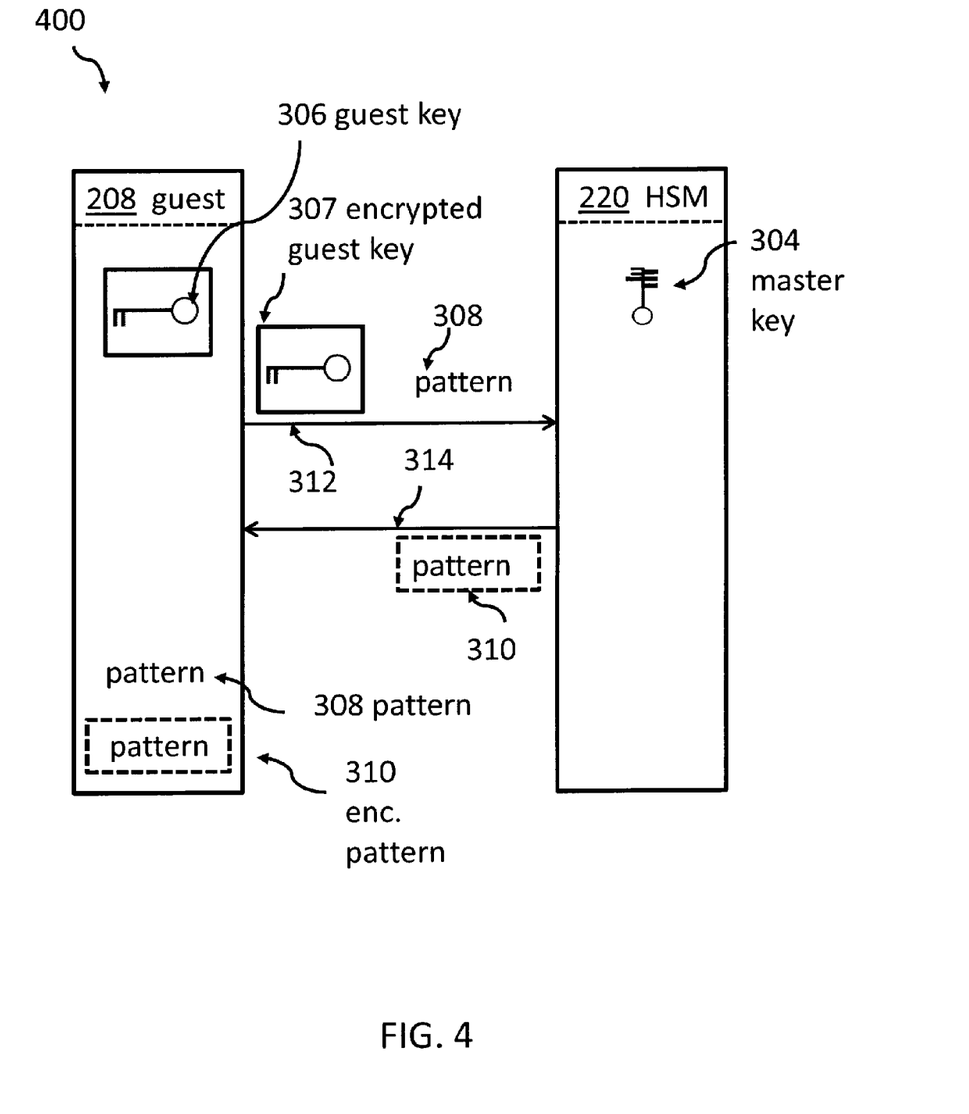
FIG. 4 shows an embodiment of another alternative of assigning at least one out of a plurality of hardware security modules to a guest system.

FIG. 4 shows an alternative embodiment 400 of the embodiment 100 for assigning at least one out of a plurality of hardware security modules 220 to a guest system 208. Also in this case, a challenge protocol may be executed. The main difference from the example discussed in the context of FIG. 3 is that the encrypted guest key 307 is sent, 312, together with an unencrypted data pattern 308 from the guest system 208 to the HSM 220. Again, respective sending and receiving units or modules may be used for such data exchange between the guest system 208 and the HSM 220.

Using the HSM 220, the encrypted guest key 307 may be decrypted using the master key 304 resulting in an unencrypted guest key 306 in the HSM 220. This unencrypted guest key 306 may be used to encrypt the data pattern 308 resulting in an encrypted data pattern 310.

Next, this newly encrypted data pattern 310 may be sent back, 314, to the guest system 208. This received encrypted data pattern 310 may be compared—by the guest system 208—against the encrypted data pattern 310 available in the guest system 208. If the two encrypted data patterns match each other, the challenge protocol has a positive outcome, i.e., a confirmation has been produced and the guest system 208 may be assigned to "its correct HSM" 220.

Figure 5:
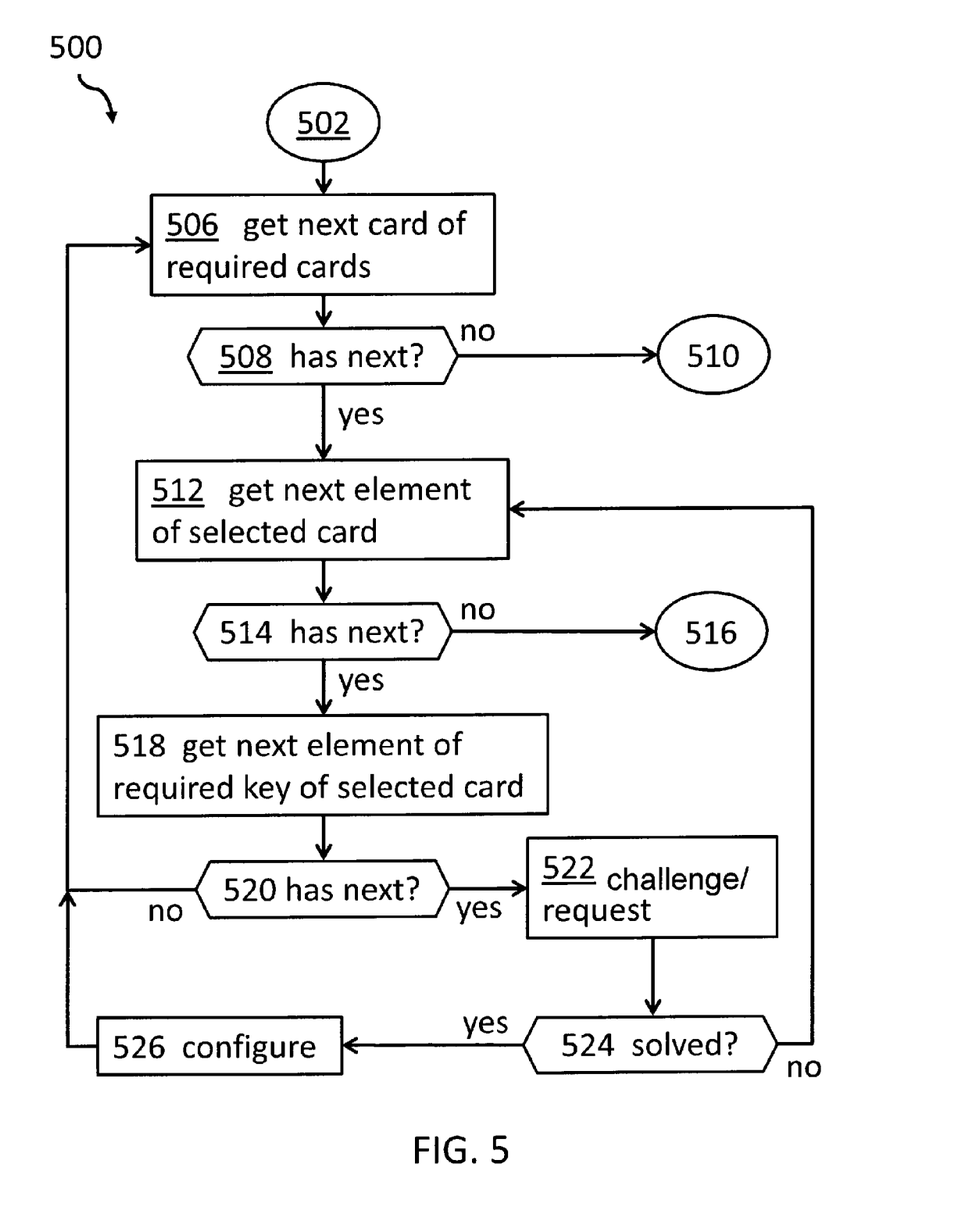
FIG. 5 shows a flowchart of how security keys of hardware security modules may be assigned to guest systems.

FIG. 5 shows a flowchart 500 of how security keys of hardware security modules 216, 218, 220 may be assigned to the guest systems. The procedure starts at 502. The procedure may iteratively perform a series of steps and tests. Firstly, a next card, i.e., hardware security module 216, 218, 220, may be accessed, 506. If no card, i.e. HSM, may be accessible, 508, the procedure may terminate at 510.

In case a card, i.e., HSM 216, 218, 220, may have been found, a next element of the selected card may be accessed, 512. If there is no next element, 514, the procedure may be terminated resulting in a bad exit 516. In case of a positive result of the test 514, a next element of keys (e.g., required keys) of the selected card may be accessed, 518. If no next key is available, 520, the procedure may return back to step 506. In case there is a next element, the above-discussed challenge protocol 522 may be executed. In case the challenge has been solved, meaning that a positive outcome may have been generated, 524, the guest system 208 may be configured, 526, to be assigned to a specific key of the selected card, i.e., selected HSM 216, 218, 220. In case of "no" during the test 524, the procedure may return back to step 512 and access the next element on the selected card. This way several keys may be assigned to a guest system 208.

It may be noted that FIG. 3 and FIG. 4 are related to the challenge/request box 522 of FIG. 5.

Figure 6:
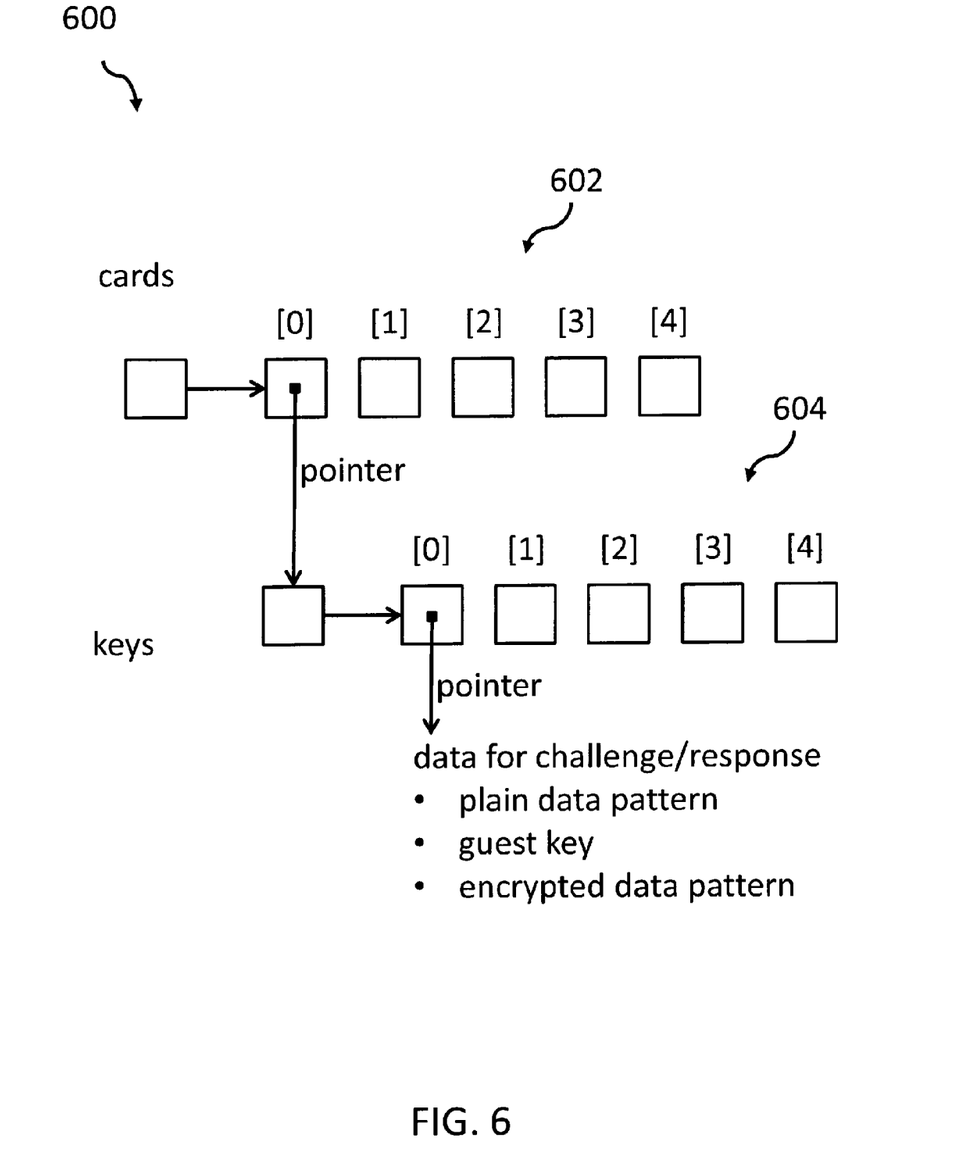
FIG. 6 shows an embodiment of a data structure supporting one or more aspects of FIG. 1.

FIG. 6 shows an embodiment of a data structure 600 supporting the embodiment of FIG. 1. The starting point may be (a) card(s) (e.g., required cards), i.e., HSM 216, 218, 220. For each card/HSM a data structure 602 having numbers [0], [1], [2], [3], [4], . . . may be provided. Each element of the data structure 602 may include a pointer to keys (e.g., required keys) 604 for a guest system 208 having numbers [0], [1], [2], [3], [4], . . . . Each element of a key (e.g., required key) may include a pointer to the data to be used for the challenge/response procedure: a plain data pattern 308, a guest key 306, and an encrypted data pattern 310. The data structure may be controlled by the hypervisor 206 or the guest system 208 or, in a combination of both.

Figure 7:
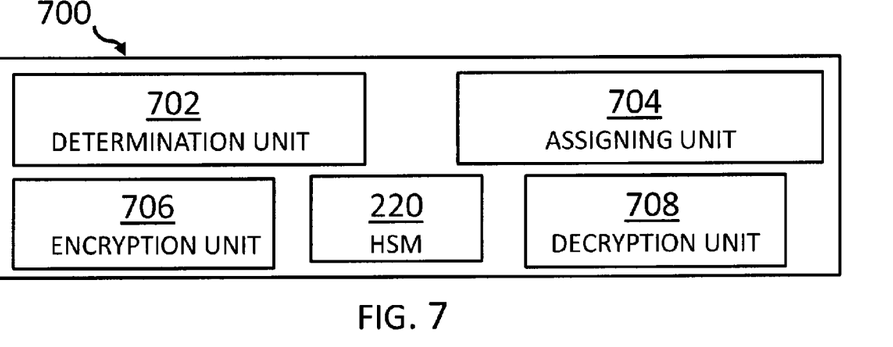
FIG. 7 shows a related assignment system.

FIG. 7 shows a related assignment system 700. The assignment system 700 for assigning at least one 220 out of a plurality of hardware security modules 216, 218, 220 to a guest system 208 based on content, e.g. data pattern 308, may include at least one hardware security module 220 out of the plurality of hardware security modules 216, 218, 220 including a memory (not explicitly shown here) adapted to store a master key 304.

The assignment system 700 may include a determination unit 702 as part of the guest system 208. The determination unit may be adapted to generate a positive outcome based on a data pattern 308 for a challenge protocol 522 adapted to prove that the at least one 220 out of the plurality of hardware security modules 216, 218, 220 include the master key.

The assignment system 700 may also include an assigning unit 704 adapted to assign the at least one 220 out of the plurality of hardware security modules 216, 218, 220 including the master key 304 to the guest system 208 based on a positive outcome of the challenge protocol 522. Additionally, sending and receiving units may be used.

Additionally, an encryption unit 706 or hardware security module encryption unit 706 and a decryption unit 708 or hardware security module decryption unit 708 may be present in the assignment system. The encryption unit 706 and the decryption unit 708 may be present within any of the HSMs 216, 218, 220.

Figure 8:
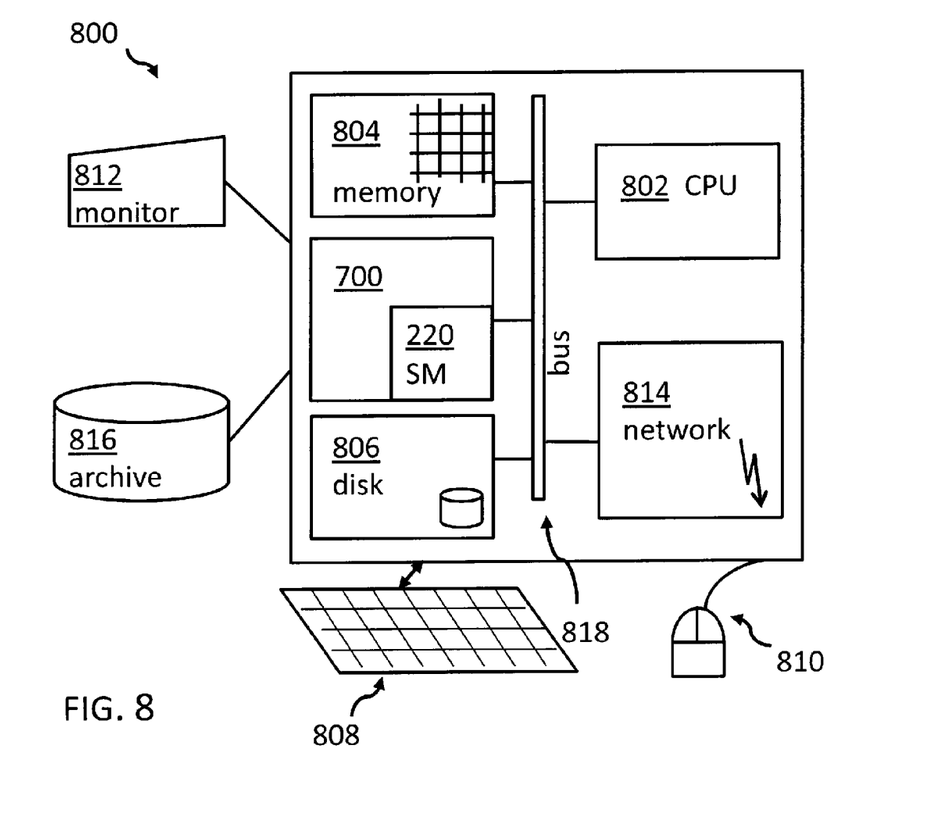
FIG. 8 shows an embodiment of a computer system for use with the assignment system of FIG. 7.

FIG. 8 shows an embodiment of a computer system 800 including the assignment system 700 of FIG. 7.

It may be noted that the assigning a guest system 208 to a specific HSM 220 may be performed on a server 202—which may be represented by a computer system 800—which may be accessed by a user 214 or user system 214 using Cloud technologies.

The term "Cloud technologies" may be used in the context of Cloud Computing based on Cloud services. Such a Cloud service may belong to Cloud Computing in general, which is a model for enabling convenient, on-demand network access to a shared pool of configurable computing resources (e.g., networks, servers, applications, and services)—in particular storage or networked storage—that can be rapidly provisioned and released with minimal management effort or service provider interaction. This Cloud model promotes availability and is composed of five essential characteristics, three service models and four deployment models. The shared networked storage may be deployed in a Cloud environment.

Characteristics of Cloud Computing include, for instance:
(i) On-demand self-service. A consumer can unilaterally provision computing capabilities, such as server time and network storage, as needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for Cloud Computing used include, for instance:
  (i) Cloud Software as a Service (SaaS). The capability provided to the consumer is to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with the possible exception of limited user-specific application configuration settings.
  (ii) Cloud Platform as a Service (PaaS). The capability provided to the consumer is to deploy onto the Cloud infrastructure consumer-created or acquired applications created using programming languages and tools supported by the provider. The consumer does not manage or control the underlying Cloud infrastructure including network, servers, operating systems, or storage, but has control over the deployed applications and possibly applications hosting environment configurations.
  (iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying Cloud infrastructure, but has control over operating systems, storage, deployed applications, and possibly limited control of selected networking components (e.g., host firewalls).

Deployment models for Cloud Computing include, for instance:
  (i) Private Cloud. The Cloud infrastructure is operated solely by an organization. It may be managed by the organization or a third party and may exist on premise or off premise.
  (ii) Community Cloud. The Cloud infrastructure is shared by several organizations and supports a specific community that has shared concerns (e.g., mission, security requirements, policy, and compliance considerations). It may be managed by the organizations or a third party and may exist on premise or off premise.
  (iii) Public Cloud. The Cloud infrastructure is made available to the general public or a large industry group and is owned by an organization selling Cloud services.
  (iv) Hybrid Cloud. The Cloud infrastructure is a composition of two or more Clouds (private, community, or public) that remain unique entities but are bound together by standardized or proprietary technology that enables data and application portability (e.g., Cloud bursting for load-balancing between Clouds).

Embodiments of the invention may be implemented together with virtually any type of computer, regardless of the platform being suitable for storing and/or executing program code. For example, as shown in FIG. 8, a computing system 800, e.g., a Cloud node, may include one or more processor(s) 802 with one or more cores per processor, associated memory elements 804, an internal storage device 806 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 804 may include a main memory, e.g., a random access memory (RAM), employed during actual execution of the program code, and a cache memory, which may provide temporary storage of at least some program code and/or data in order to reduce the number of times code and/or data must be retrieved from a long-term storage medium or external bulk storage 816 for an execution. Elements inside the computer 800 may be linked together by means of a bus system 818 with corresponding adapters. Additionally, a assignment system 700—as described above—may be attached to the bus system 818.

The computing system 800 may also include input means such as a keyboard 808, a pointing device such as a mouse 810, or a microphone (not shown). Alternatively, the computing system may be equipped with a touch sensitive screen as main input device. Furthermore, the computer 800, may include output means such as a monitor or screen 812 (e.g., a liquid crystal display (LCD), a plasma display, a light emitting diode display (LED), or cathode ray tube (CRT) monitor). The computer system 800 may be connected to a network (e.g., a local area network (LAN), a wide area network (WAN)), such as the Internet or any other similar type of network, including wireless networks via a network interface connection 814. This may allow a coupling to other computer systems, or a storage network, or a tape drive. Those, skilled in the art will appreciate that many different types of computer systems exist, and the aforementioned input and output means may take other forms. Generally speaking, the computer system 800 may include at least the minimal processing, input and/or output means, necessary to practice embodiments of the invention.

One or more aspects of assigning at least one out of a plurality of hardware security modules to a guest system may offer the following:

If several hardware security modules may be available for a hypervisor, it may be ensured that HSMs/hardware cards/domains may be assigned to specific guests, e.g., virtual machines. This may be done in the way that individual master keys may be available on the one or more hardware security modules only. The master key may not need to be transferred over to the guest system. Actually, the master key may, in one embodiment, never leave the HSM. Additionally, there is no need for a profile/setup description file with location information, e.g., hardware slot number, for a specific hardware security module including a specific cryptographic key to be assigned to a guest system or vice versa. Conventional systems may require such a setup description including specific slot locations in order to assign a guest system to a specific hardware security module. In such a case, a successful assignment may depend on very carefully plugged hardware security modules/cards. Mistakes in plugging the one or more hardware security modules into specific and potentially predetermined slots may lead to a high impact error situation, i.e., access to wrong key material by the guest system or missing of required security keys. One or more aspects may by designed to avoid such mistakes because guest operating systems being executed on a hypervisor may find "its correct hardware security module" autonomously and at the same time ensure that a master key may not leave the hardware security module. This may ensure a high reliability of the assignment process as well as high security standards. The master key on the hardware security module may not be compromised during any transfer.

Furthermore, no manual assignment process may be required. If—in a conventional system—guest systems are not enabled to enable an automatic assignment process, a manual assignment process may be required. In high frequent VM generation and termination environments, this can be an impossible task to manage by a human operator. One or more aspects overcome such conventional limitations by technical means of the interrelated functions of the determination unit as well as dedicated encryption and decryption units as well as sending and receiving units related to a hypervisor, a guest system as well as the HSM. One or more aspects are independent of manual mappings between hardware security modules and functions.

According to a further embodiment, the guest key may be encrypted with the master key. This may be performed in the hardware security module as part of an initialization step. It may be noted that also during this initialization step, the master key may not leave the security module during the encryption of the guest key. The guest key may have been sent to the hardware security module and may be received back in an encrypted way by the guest system, or a related hypervisor.

One embodiment may also include encrypting the data pattern with a guest key. This way, the data pattern may be available in an unencrypted original form as well as in an encrypted form in the guest system.

A further embodiment may include decrypting the encrypted guest key by the at least one hardware security module. This process may be useful, if—during regular operation after the initialization process—the encrypted guest key and the encrypted data pattern may be sent to the hardware security module. Now, the hardware security module may be enabled to decrypt the encrypted guest key with the master key available within the hardware security module and, in the next step, decrypt the encrypted data pattern with the decrypted guest key resulting in an encrypted data pattern.

Another embodiment may also include decrypting the encrypted data pattern by the at least one hardware security module using the decrypted guest key resulting in the data pattern available within the HSM as well as on the guest system side. This unencrypted data pattern may be sent to the guest system in a next step.

According to one embodiment, the challenge protocol may include generating the positive outcome if it is determined by the guest system that the decrypted data pattern by the at least one hardware security module is identical to the data pattern encrypted by the guest system. This may require that the decrypted data pattern may have been sent to the guest system after a decryption within the hardware security module. Also, this procedure may ensure that the master key will not leave the hardware security module. On the other side, it may be determined on the guest system side that the guest system and a specific key within the hardware security key module are to be assigned to each other.

One embodiment may also include encrypting the data pattern by the at least one hardware security module using the decrypted guest key resulting in an encrypted data pattern within the HSM. This embodiment changes the basis for the above-described challenge protocol in that the encrypted data pattern is to be compared in a next step.

According to one alternative embodiment, the challenge protocol may include generating the positive outcome if it is determined by the guest system that the encrypted data pattern encrypted by the at least one hardware security module is identical to the encrypted data pattern which has been encrypted by the guest system before.

According to an embodiment, the configuring of the at least one hardware security module, the using the data pattern for the challenge protocol, and the assigning the at least one out of a plurality of hardware security modules to the guest system is performed by trusted firmware. This may be a component of a hypervisor running on a related hardware server or a trusted component—hardware or software—working in collaboration with the hypervisor.

According to one embodiment, the data pattern may be selected or determined randomly, in particular, by the guest system or the hypervisor. Alternatively, the data pattern may be predefined according to rules related to a specific guest system. Thus, the proposed technique allows for complete freedom in selecting the data pattern independently from the HSM.

It may be noted that the discussed embodiments may also be in a related form and using hardware components like, e.g., an HSM encryption unit, an HSM decryption unit and sending and receiving modules applicable to the assignment system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should be noted that embodiments have been described with reference to different subject-matters. In particular, some embodiments have been described with reference to method type claims whereas other embodiments have been described with reference to apparatus type claims. However, a person skilled in the art will gather from herein that, unless otherwise notified, in addition to any combination of features belonging to one type of subject-matter, also any combination between features relating to different subject-matters, e.g., between features of the method type claims, and features of the apparatus type claims, is considered as to be disclosed within this document.

The aspects defined herein and further aspects are apparent from the examples of embodiments described herein and are explained with reference to the examples of embodiments, but to which the aspects are not limited.

While aspects of the invention have been described with respect to a limited number of embodiments, those skilled in the art, having benefit of this disclosure, will appreciate that other embodiments may be devised, which do not depart from the scope of the aspects of invention, as disclosed herein. Accordingly, the scope of the invention should be limited only by the attached claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of aspects of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of aspects of the invention and the practical application, and to enable others of ordinary skills in the art to understand aspects of the invention for various embodiments with various modifications, as are suited to the particular use contemplated.

What is claimed is:

1. An assignment system comprising:
   a memory; and
   a processor communicatively coupled to the memory, wherein the assignment system performs a method comprising:
   configuring at least one hardware security module of a plurality of hardware security modules with a master key;
   establishing, by a guest system, that the at least one hardware security module of the plurality of hardware security modules is configured with the master key, the establishing using, by the guest system, a data pattern for a challenge protocol to prove that the at least one hardware security module of the plurality of hardware security modules is configured with the master key, the challenge protocol comprising:
   obtaining, by the guest system, an unencrypted guest key, an encrypted guest key, an unencrypted data pattern, and an encrypted data pattern, the encrypted guest key comprising the unencrypted guest key of the guest system encrypted using the master key, and the encrypted data pattern having been encrypted by the guest system using the unencrypted guest key;
   sending by the guest system, the encrypted guest key to the at least one hardware security module along with a guest data pattern, the guest data pattern being either the encrypted data pattern or the unencrypted data pattern;
   decrypting the encrypted guest key by the at least one hardware security module using the master key, and obtaining for return to the guest system a host data pattern, the host data pattern being the other of the encrypted data pattern or the unencrypted data pattern, the obtaining including using the unencrypted guest key by the at least one hardware security module on the guest data pattern;
   sending, by the at least one hardware security module, the host data pattern to the guest system;
   comparing, by the guest system, the host data pattern with at least one of the unencrypted data pattern or the encrypted data pattern to determine whether the challenge protocol has a positive outcome; and
   based on the establishing obtaining the positive outcome of the challenge protocol, assigning the at least one hardware security module of the plurality of hardware security modules configured with the master key to the guest system.

2. The assignment system of claim 1, wherein the the guest data pattern comprises the encrypted data pattern.

3. The assignment system of claim 2, wherein the decrypting comprises decrypting the encrypted data pattern by the at least one hardware security module using the decrypted guest key resulting in the unencrypted data pattern.

4. The assignment system of claim 3, wherein the challenge protocol further comprises generating the positive outcome based on the guest system determining that the host data pattern returned from the at last one hardware security module comprises the unencrypted data pattern and is identical to the unencrypted data pattern before being encrypted by the guest system.

5. The assignment system of claim 1, wherein the host data pattern comprises the encrypted data pattern, generated by the at least one hardware security module using the decrypted guest key.

6. The assignment system of claim 5, wherein the challenge protocol comprises generating the positive outcome based on the guest system determining that the encrypted data pattern received from the at least one hardware security module is identical to the encrypted data pattern obtained by the guest system.

7. The assignment system of claim 1, wherein the unencrypted data pattern is selected randomly.

8. A computer program product for assigning at least one hardware security module of a plurality of hardware security modules to a guest system, the computer program product comprising:
   a non-transitory computer readable storage medium readable by a processing circuit and storing instructions for execution by the processing circuit for performing a method comprising:
   configuring at least one hardware security module of a plurality of hardware security modules with a master key;
   establishing, by a guest system, that the at least one hardware security module of the plurality of hardware security modules is configured with the master key, the establishing using, by the guest system, a data pattern for a challenge protocol to prove that the at least one hardware security module of the plurality of hardware security modules is configured with the master key, the challenge protocol comprising:
   obtaining, by the guest system, an unencrypted guest key, an encrypted guest key, an unencrypted data pattern, and an encrypted data pattern, the encrypted guest key comprising the unencrypted guest key of the guest system encrypted using the master key, and the encrypted data pattern having been encrypted by the guest system using the unencrypted guest key;
   sending by the guest system, the encrypted guest key to the at least one hardware security module along with a guest data pattern, the guest data pattern being either the encrypted data pattern or the unencrypted data pattern;
   decrypting the encrypted guest key by the at least one hardware security module using the master key, and obtaining for return to the guest system a host data pattern, the host data pattern being the other of the encrypted data pattern or the unencrypted data pattern, the obtaining including using the unencrypted guest key by the at least one hardware security module on the guest data pattern;
   sending, by the at least one hardware security module, the host data pattern to the guest system;
   comparing, by the guest system, the host data pattern with at least one of the unencrypted data pattern or the encrypted data pattern to determine whether the challenge protocol has a positive outcome; and
   assigning the at least one hardware security module of the plurality of hardware security modules with the master key to the guest system based on the positive outcome of the challenge protocol.

9. The computer program product of claim 8, wherein the guest data pattern comprises the encrypted data pattern.

10. The computer program product of claim 9, wherein the decrypting comprises decrypting the encrypted data pattern by the at least one hardware security module using the guest key resulting in the unencrypted data pattern.

11. The computer program product of claim 10, wherein the challenge protocol further comprises generating the positive outcome based on the guest system determining that the host data pattern returned from the at last one hardware security module comprises the unencrypted data pattern and is identical to the data pattern before being encrypted by the guest system.

12. The computer program product of claim 8, wherein the host data pattern comprises the encrypted data pattern, generated by the at least one hardware security module using the decrypted guest key.

13. The computer program product of claim 12, wherein the challenge protocol further comprises generating the positive outcome based on the guest system determining that the encrypted data pattern received from the at least one hardware security module is identical to the encrypted data pattern obtained by the guest system.

14. The computer program product of claim 8, wherein the unencrypted data pattern is selected randomly.

* * * * *